C. C. WATSON.
HOG TRAP.
APPLICATION FILED AUG. 11, 1915.
1,227,712.
Patented May 29, 1917.
2 SHEETS—SHEET 1.
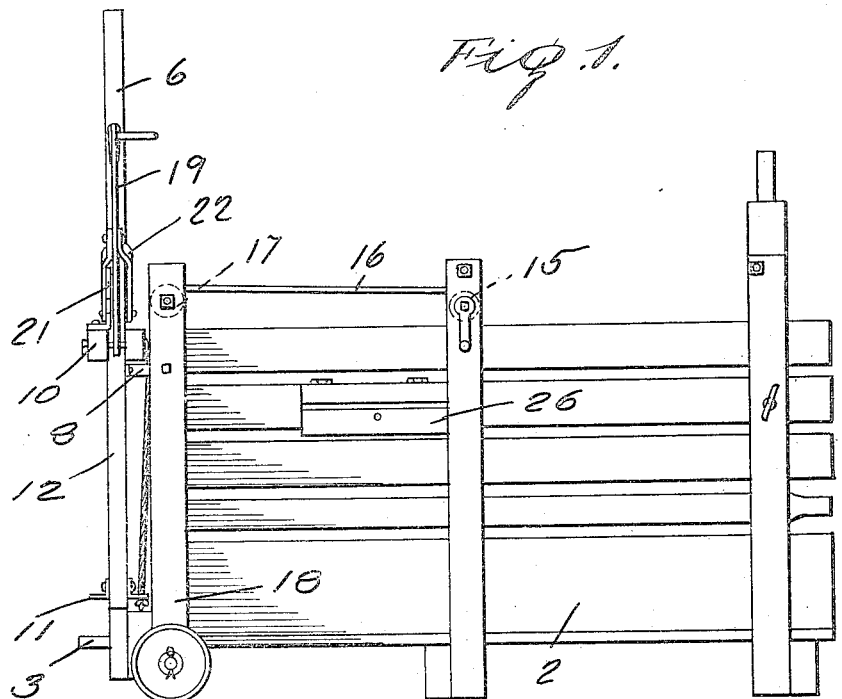
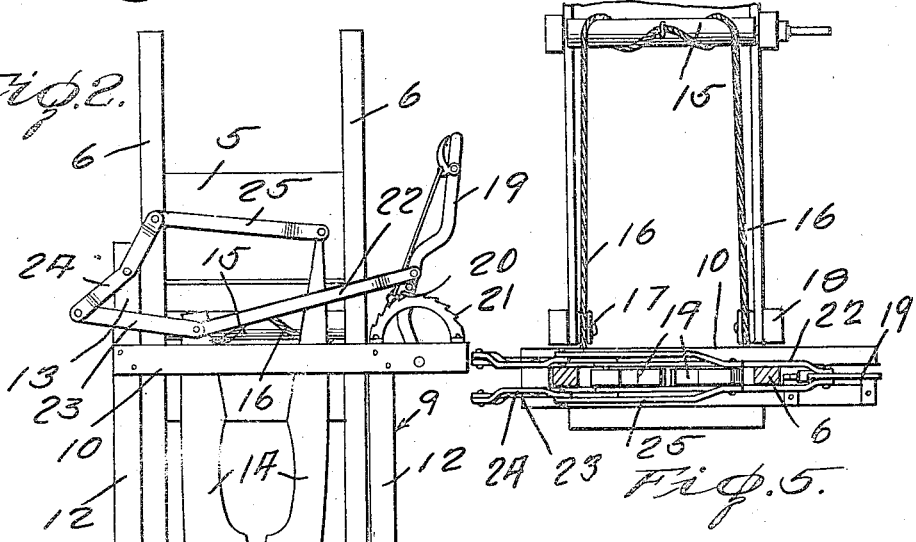
Witnesses
Inventor
C. C. Watson C. C. WATSON.
HOG TRAP.
APPLICATION FILED AUG. 11, 1915.
1,227,712.
Patented May 29, 1917.
2 SHEETS—SHEET 2.
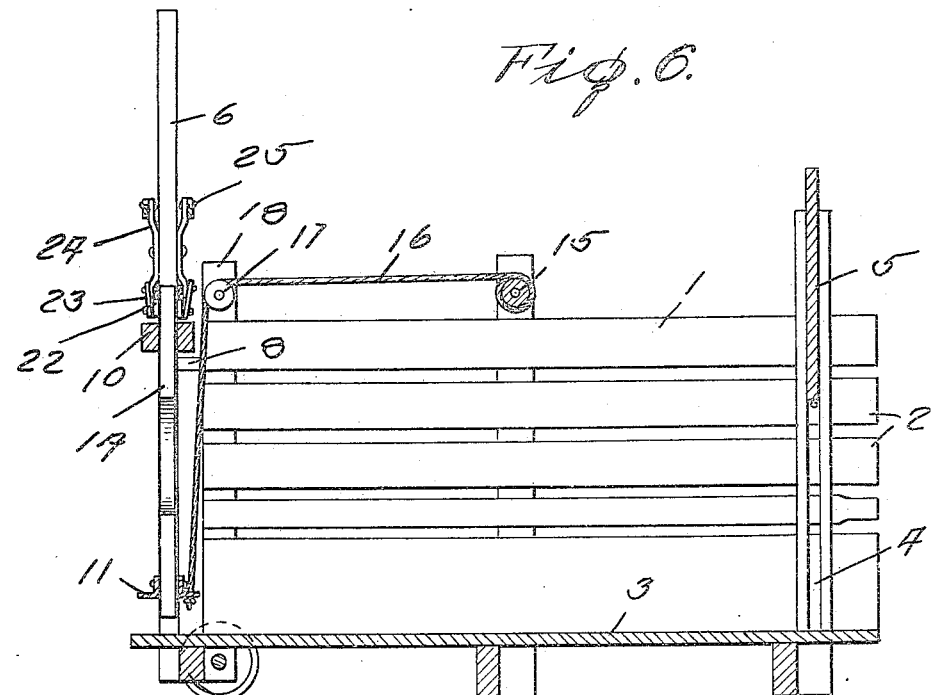
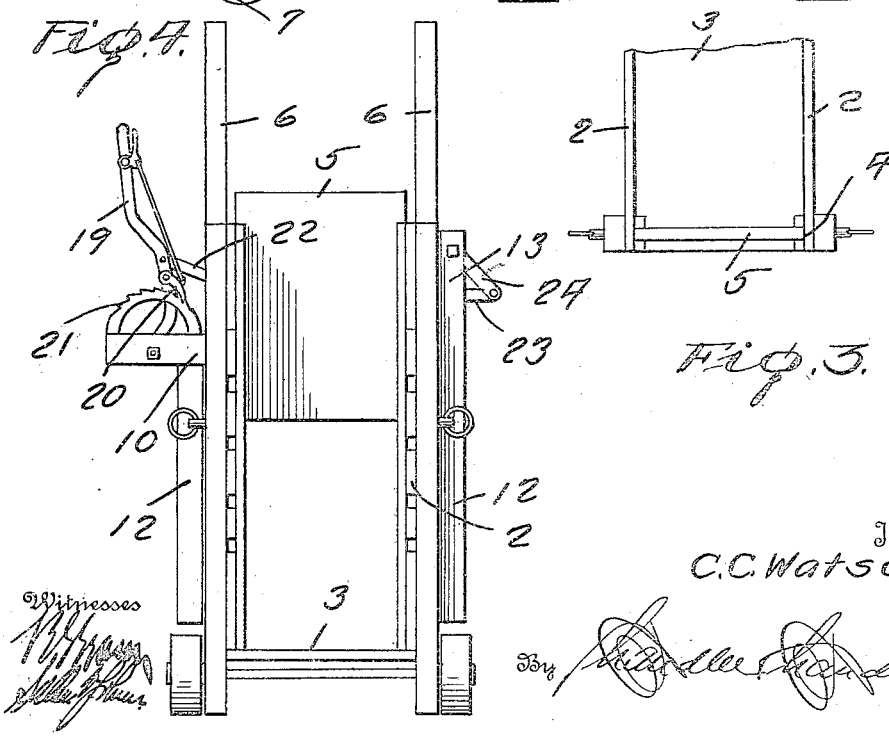
Inventor
C. C. Watson

UNITED STATES PATENT OFFICE.

CLARENCE C. WATSON, OF WATERMAN, ILLINOIS.

HOG-TRAP.

1,227,712. Specification of Letters Patent. Patented May 29, 1917.

Application filed August 11, 1915. Serial No. 44,971.

*To all whom it may concern:*

Be it known that I, CLARENCE C. WATSON, a citizen of the United States, residing at Waterman, in the county of Dekalb, State of Illinois, have invented certain new and useful Improvements in Hog-Traps; and I do hereby declare the following to be a full, clear, and exact description of the invention, such as will enable others skilled in the art to which it appertains to make and use the same.

The present invention is directed to improvements in hog traps, and has for its object to provide a device of this character so constructed as to hold the hog when applying nose rings, or for other purposes.

A further object of the invention is to provide a hog trap with novel means for operating the neck engaging bars.

A still further object of the invention is to provide a device of this character wherein the neck engaging bars serve as a closure for the forward end of the trap, and further to provide means for raising or lowering the neck engaging bars.

With these and other objects in view, this invention resides in the novel features of construction, formation, combination and arrangement of parts to be hereinafter more fully described, claimed and illustrated in the accompanying drawing, in which:—

Figure 1 is a side elevation of the device.

Fig. 2 is a front view.

Fig. 3 is a fragmentary top plan view of the rear end of the device.

Fig. 4 is a rear view.

Fig. 5 is a fragmentary top plan view of the forward end of the device.

Fig. 6 is a longitudinal sectional view through the device.

Referring to the drawing 1 indicates the trap, which consists of sides 2, and a bottom 3, the rear end of said trap being provided with guides 4 for slidably receiving the door 5.

The forward edge of the bottom 3 is projected beyond the sides 2, and has resting against the side edges thereof the lower ends of the uprights 6, said uprights having their lower ends secured to the cross bar 7, said uprights being held spaced from the forward edges of the sides 2 by brackets 8.

A frame 9 is provided and consists of a pair of upper bars 10 and lower bars 11, said bars being held in spaced relation by vertical bars 12, one of which terminates in an extension 13, the purpose of which will appear later. A pair of neck engaging bars 14 are employed, and have their lower ends adjustably and pivotally mounted between the bars 11, and their upper ends slidably engaged between the bars 10. The frame 9 is slidably engaged with the uprights 6, which pass between the bars 10 and the bars 11.

A windlass 15 is associated with the trap and has windable thereon ropes 16, which pass over grooved pulleys 17, which are supported by the vertical side bars 18, said ropes being secured to the lower ends of the bars 12.

Pivotally connected between the bars 10 is a hand lever 19, which is provided with a pawl 20 adapted to coact with the racked segment 21, carried by one of the bars, whereby the lever can be held in different adjusted positions. Connecting the lever 19 and the upper end of one of the neck engaging bars 14, is a link 22, said neck engaging bar having also pivotally connected thereto a link 23, which has its outer end pivotally connected to a lever 24, said lever being pivotally connected to the extension 13. The other neck engaging bar is connected to the upper end of the lever 24 by the link 25. Thus it will be seen that the lever 19 can be shifted to spread or close the bars 14, when desired.

From the foregoing description it will be seen that upon raising the door, that the animal can be driven into the trap, whereupon the neck engaging bars are actuated to engage the neck of the animal. After the animal has been operated upon the bars 14 are released upon shifting of the lever 19, after which the frame 9 is raised by operating the windlass 15, thereby permitting the animal to leave the trap.

A box 26 is attached to one side of the trap for containing tools necessary for ringing, etc.

The pivot pins 27 of the neck engaging bars 14 are adapted to interchangeably engage the slots 28 formed in the bars 11, whereby said bars may be adjusted for engaging necks of different sizes.

What is claimed is:—

A hog trap including sides, a bottom, a closure for the rear end of said sides, uprights engaging said bottom, a frame slidably associated with said uprights and including upper and lower horizontal bars, vertical bars connecting the first named bars and arranged on the outer side edges of said uprights, said lower bars having slots communicating with the upper edges thereof, neck engaging members having pins for selective engagement with said slots whereby to pivot said members to said lower bars and adjust said members relative to each other, and means supported by said frame and connected to the upper portions of said neck engaging members for adjusting said upper portions relative to each other.

In testimony whereof, I affix my signature, in the presence of two witnesses.

CLARENCE C. WATSON.

Witnesses:
HUMPHREY ROBERTS,
GEO. B. HOWISON.

Copies of this patent may be obtained for five cents each, by addressing the "Commissioner of Patents, Washington, D. C."